United States Patent
Steinhauser et al.

(10) Patent No.: US 9,593,228 B2
(45) Date of Patent: Mar. 14, 2017

(54) MIXTURES COMPOSED OF FUNCTIONALIZED DIENE RUBBERS WITH TRIMETHYLOLPROPANE AND FATTY ACID, A PROCESS FOR PRODUCTION THEREOF AND USE THEREOF

(75) Inventors: Norbert Steinhauser, Monheim (DE); Heike Kloppenburg, Düsseldorf (DE); David Hardy, Monheim (DE); Alex Lucassen, Dormagen (DE); Dietmar Hoff, Mannheim (DE); Michaela Meiers, Aachen (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 294 days.

(21) Appl. No.: 13/321,992

(22) PCT Filed: May 14, 2010

(86) PCT No.: PCT/EP2010/056663
§ 371 (c)(1),
(2), (4) Date: Jul. 3, 2012

(87) PCT Pub. No.: WO2010/136345
PCT Pub. Date: Dec. 2, 2010

(65) Prior Publication Data
US 2012/0270974 A1 Oct. 25, 2012

(30) Foreign Application Priority Data

May 27, 2009 (DE) ........................ 10 2009 023 915

(51) Int. Cl.
*C08L 9/06* (2006.01)
*C08K 3/34* (2006.01)
(52) U.S. Cl.
CPC ..................................... *C08K 3/34* (2013.01)
(58) Field of Classification Search
CPC ................ C08K 3/34; C08L 7/00; C08L 9/00
See application file for complete search history.

(56) References Cited

U.S. PATENT DOCUMENTS

| 3,842,111 | A | 10/1974 | Meyer-Simon |
| 3,873,489 | A | 3/1975 | Thurn et al. |
| 3,978,103 | A | 8/1976 | Meyer-Simon et al. |
| 3,997,581 | A | 12/1976 | Pletka et al. |
| 5,580,919 | A | 12/1996 | Agostini et al. |
| 5,583,245 | A | 12/1996 | Parker et al. |
| 5,663,396 | A | 9/1997 | Musleve et al. |
| 5,684,171 | A | 11/1997 | Wideman et al. |
| 5,684,172 | A | 11/1997 | Wideman et al. |
| 5,696,197 | A | 12/1997 | Smith et al. |
| 5,717,022 | A | 2/1998 | Beckmann et al. |
| 5,830,817 | A | 11/1998 | Graf et al. |
| 5,852,099 | A | 12/1998 | Vanel |
| 5,900,449 | A | 5/1999 | Custodero et al. |
| 6,334,476 | B1 | 1/2002 | Okamura et al. |
| 6,536,492 | B2 | 3/2003 | Vasseur |
| 6,747,087 | B2 | 6/2004 | Custodero et al. |
| 6,797,780 | B2 | 9/2004 | Obrecht et al. |
| 6,974,851 | B2 | 12/2005 | Gronowski et al. |
| 7,078,449 | B2 | 7/2006 | Pagano et al. |
| 7,312,264 | B2 | 12/2007 | Gandon-Pain |
| 7,323,582 | B2 | 1/2008 | Deschler et al. |
| 7,799,938 | B2 | 9/2010 | Korth et al. |
| 8,173,741 | B2 * | 5/2012 | Steinhauser et al. .......... 524/572 |
| 2006/0254734 | A1 * | 11/2006 | Hannay et al. ............... 162/134 |
| 2008/0027162 | A1 * | 1/2008 | Hua et al. ...................... 524/262 |
| 2008/0251174 | A1 * | 10/2008 | Romani et al. ............. 152/209.1 |
| 2008/0295935 | A1 * | 12/2008 | Kobayashi et al. ....... 152/209.1 |
| 2010/0293814 | A1 * | 11/2010 | Skaja et al. .................... 36/25 R |
| 2012/0270974 | A1 * | 10/2012 | Steinhauser et al. ........... 524/87 |

FOREIGN PATENT DOCUMENTS

| DE | 102004039545 A1 | 2/2006 |
| DE | 102008023885 A1 * | 11/2009 |
| EP | 1101789 | 5/2001 |
| EP | 1253167 A | 10/2002 |
| EP | 1626062 | 2/2006 |
| JP | 2006008749 | 1/2006 |
| JP | 2008150435 | 7/2008 |
| WO | 2009138349 A1 | 11/2009 |

OTHER PUBLICATIONS

English machine translation of EP 1253167 to Meier. Obtained from espacenet.com on Aug. 24, 2013.*
International Search Report from co-pending Application PCT/EP2010/056663 dated Aug. 26, 2010, 2 pages.

* cited by examiner

*Primary Examiner* — Michael A Salvitti

(57) ABSTRACT

The invention relates to functionalized diene rubbers with trimethylolpropane and fatty acid, to a process for production there of and use thereof for the production of wet-skid-resistant and low-rolling-resistance motor-vehicle tire treads with high abrasion resistance.

6 Claims, No Drawings

MIXTURES COMPOSED OF FUNCTIONALIZED DIENE RUBBERS WITH TRIMETHYLOLPROPANE AND FATTY ACID, A PROCESS FOR PRODUCTION THEREOF AND USE THEREOF

The invention relates to functionalized diene rubbers with trimethylolpropane and fatty acid, to their use for the production of wet-skid-resistant, low-rolling-resistance motor-vehicle tyre treads with high abrasion resistance, and to a production process.

An important property desired in tyres is good adhesion to dry and wet surfaces. It is very difficult here to improve the skid resistance of a tyre without simultaneously impairing rolling resistance and abrasion. Low rolling resistance is significant for low fuel consumption, and high abrasion resistance is the decisive factor for long tyre lifetime.

The wet skid resistance and rolling resistance of a tyre depend largely on the dynamic mechanical properties of the rubbers used to construct the tyre. In order to lower rolling resistance, rubbers with high rebound resilience at relatively high temperatures (from 60° C. to 100° C.) are used for the tyre tread. On the other hand, rubbers with a high damping factor at low temperatures (0° C.) or, respectively, with low rebound resilience in the range from 0° C. to 23° C. are advantageous for improving wet skid resistance. In order to comply with the said complex requirements profile, mixtures composed of various rubbers are used in the tread. The usual method uses mixtures composed of one or more rubbers with relatively high glass transition temperature, e.g. styrene-butadiene rubber, and of one or more rubbers with relatively low glass transition temperature, e.g. polybutadiene with high 1,4-cis content or, respectively, a styrene-butadiene rubber with low styrene content and very low vinyl content or a polybutadiene produced in solution with low vinyl content.

By using finely dispersed precipitated silica as reinforcing filler, it is possible to achieve a reduction in the rolling resistance of tyre treads and improved grip under wet conditions. The silica here is used either alone or in combination with carbon black. However, use of precipitated silica leads to increased viscosity of the unvulcanized rubber mixture, and this is problematic during processing. A large number of measures have been described for lowering the viscosity of the mixture, e.g. in EP 0761734. EP 0761734 in particular describes the use of trimethylolpropane as processing aid, permitting lowering of the viscosity of the mixture with a simultaneous increase in the rebound resilience of the vulcanized mixture at 70° C., indicating reduced rolling resistance. DE 10 2004 039 545 reveals that the combination of trimethylolpropane and fatty acids as processing aids can lower the viscosity of the mixture without impairing the mechanical properties of the vulcanized rubber mixture. EP 1 253 167 says that a combination of a diene rubber having polar groups, silica and non-aromatic, polar substances having at least one hydroxy group, e.g. trimethylolpropane, gives vulcanizates having improved grip under wet conditions, without any great impairment of rolling resistance. At the same time, the non-aromatic, polar substances having at least one hydroxy group reduce the viscosity of the rubber mixture.

The disadvantage of all of these measures is that use of processing aids is not successful in reducing the viscosity of the rubber mixture and simultaneously lowering the rolling resistance of the vulcanizate and increasing its grip under wet conditions.

An object was therefore to provide rubber mixtures which do not have the disadvantages of the prior art.

Surprisingly, it has now been found that the vulcanizable rubber mixtures of the invention, comprising
A) at least one diene rubber functionalized with carboxy groups and/or hydroxy groups and/or with their salts and having a polymer chain composed of repeat units based on at least one diene and optionally on one or more vinylaromatic monomers,
B) at least one pale-coloured filler,
C) trimethylolpropane,
D) at least one fatty acid,
E) optionally further rubber additives
have reduced viscosity of the mixture and at the same time provide, in the vulcanizate, advantages both in the rolling resistance and in wet skid performance.

The rubber mixtures of the invention here can also comprise further rubbers F).

The invention therefore provides vulcanizable rubber mixtures comprising
A) at least one diene rubber functionalized with carboxy groups and/or hydroxy groups and/or with their salts and having a polymer chain composed of repeat units based on at least one diene and optionally on one or more vinylaromatic monomers,
B) at least one pale-coloured filler,
C) trimethylolpropane,
D) at least one fatty acid and
E) optionally further rubber additives,
F) optionally further rubbers.

The dienes in the functionalized diene rubber (A) are preferably 1,3-butadiene, isoprene, 1,3-pentadiene, 2,3-dimethylbutadiene, 1-phenyl-1,3-butadiene and/or 1,3-hexadiene. It is particularly preferable to use 1,3-butadiene and/or isoprene.

For the purposes of the invention, vinylaromatic monomers are preferably styrene, o-, m- and/or p-methylstyrene, p-tert-butylstyrene, α-methylstyrene, vinylnaphthalene, divinylbenzene, trivinylbenzene and/or divinylnaphthalene. It is particularly preferable to use styrene.

In one preferred embodiment of the invention, the functionalized diene rubbers (A) have from 0 to 60% by weight, preferably from 10 to 45% by weight, content of copolymerized vinylaromatic monomers, and from 40 to 100% by weight, preferably from 55 to 90% by weight, content of dienes, where the content of 1,2-bonded dienes (vinyl content) in the dienes is from 0.5 to 95% by weight, preferably from 10 to 85% by weight, and the total amount of copolymerized vinylaromatic monomers and dienes is 100%.

It is particularly preferable that the functionalized diene rubbers (A) are composed of from 40 to 100% by weight of 1,3-butadiene and from 0 to 60% by weight of styrene, where the proportion of bonded functional groups and/or of their salts is from 0.02 to 5% by weight, based on 100% by weight of diene rubber.

Functional groups and/or their salts in the functionalized diene rubber are carboxy and/or hydroxy groups. Preferred salts are alkali metal carboxylates, alkaline earth metal carboxylates, zinc carboxylates and ammonium carboxylates.

In one very particularly preferred embodiment of the invention, (A) is a functionalized diene rubber which is composed of repeat units based on 1,3-butadiene and styrene and which has been functionalized with hydroxy groups and/or with carboxy groups.

The functionalized diene rubbers (A) here are preferably produced via polymerization of dienes and optionally of vinylaromatic monomers in solution and subsequent introduction of functional groups, e.g. as described in DE 102008023885.6.

The rubber mixtures of the invention can also comprise other rubbers (F), such as natural rubber or else other synthetic rubbers, alongside the functionalized diene rubbers (A) mentioned. The amount of these, if they are present, is usually in the range from 0.5 to 95% by weight, preferably from 10 to 80% by weight, based on the entire amount of rubber in the rubber mixture. The amount of additionally added rubbers in turn depends on the respective intended use of the rubber mixtures of the invention.

By way of example, synthetic rubbers known from the literature are listed here. They encompass inter alia BR—polybutadiene
ABR—butadiene/$C_1$-$C_4$-alkyl acrylate copolymers
IR—polyisoprene
ESBR—styrene-butadiene copolymers with styrene contents of from 1 to 60% by weight, preferably from 20 to 50% by weight, produced via emulsion polymerization
IIR—isobutylene-isoprene copolymers
NBR—butadiene-acrylonitrile copolymers with acrylonitrile contents of from 5 to 60% by weight, preferably from 10 to 40% by weight
HNBR—partially hydrogenated or completely hydrogenated NBR rubber
EPDM—ethylene-propylene-diene terpolymers
Solution SBR—styrene-butadiene copolymers produced via solution polymerization
and mixtures of the said rubbers. For the production of motor-vehicle tyres, materials of particular interest are natural rubber, ESBR, and also solution SBR with glass transition temperature above −50° C., polybutadiene rubber with high cis-content (>90%), produced using catalysts based on Ni, Co, Ti or Nd, and polybutadiene rubber having up to 90% vinyl content, and mixtures of these.

Pale-coloured fillers (B) that can be used for the rubber mixtures of the invention are any of the known pale-coloured fillers used in rubber industry. These encompass not only active fillers but also inert fillers.

For the purposes of the invention, a pale-coloured filler includes a reinforcing filler.

For the purposes of the invention, a reinforcing filler is preferably one which, on addition of from 10 to 100% by weight, brings about a modulus increase of at least 100%.

According to the invention, it is possible to use one or more pale-coloured reinforcing fillers. For the purposes of the invention "pale-coloured" in particular excludes carbon black. According to the invention, it is nevertheless possible, in addition to the pale-coloured filler, to use carbon black, where these are the materials usually used in pneumatic tyres and in particular in the treads of pneumatic tyres.

Examples of these are carbon blacks produced by the flame process, channel process, furnace process, gas process, thermal process, acetylene process or arc process, their BET surface areas being from 9 to 200 $m^2$/g, e.g. SAF (super abrasion furnace), ISAF-LS (intermediate super abrasion furnace low structure), ISAF-HM (intermediate super abrasion furnace high modulus), ISAF-LM (intermediate super abrasion furnace low modulus), ISAF-FIS (intermediate super abrasion furnace high structure), CF (conductive furnace), SCF (super conductive furnace), HAF-LS (high abrasion furnace low structure), HAF, HAF-HS (high abrasion furnace high structure), FF-HS (fine furnace high structure), SPF (super processing furnace), XCF (extra conductive furnace), FEF-LS (fast extrusion furnace low structure), FEF (fast extrusion furnace), FEF-HS (fast extrusion furnace high structure), GPF-HS (general purpose furnace high structure), GPF (general purpose furnace), APF (all purpose furnace), SRF-LS (semi-reinforcing furnace low structure), SRF-LM (semi-reinforcing furnace low modulus), SRF-HS (semi-reinforcing furnace high structure), SRF-HM (semi-reinforcing furnace high modulus) and MT (medium thermal) carbon blacks, and the following types of carbon black according to ASTM classification: N110, N115, N134, N219, N220, N231, N234, N242, N294, N326, N327, N330, N332, N339, N347, N351, N356, N358, N375, N472, N539, N550, N568, N650, N660, N754, N762, N765, N774, N787 and N990.

However, the proportion of the pale-coloured reinforcing filler is more than 50% by weight, preferably more than 80% by weight, based on the total amount of the reinforcing filler used. The proportion of carbon black is preferably less than 50% by weight and more preferably less than 20% by weight. In one particular embodiment, no carbon black is added in the process of the invention. The reinforcing pale-coloured filler is preferably oxidic fillers, such as silica ($SiO_2$) or aluminium oxide ($Al_2O_3$), or a mixture thereof. The silica used can be any desired reinforcing silica, these silicas being materials that are known to the person skilled in the art, in particular any desired precipitated silica or fumed silica with a BET surface area, and also a specific surface area determined using CTAB both below 450 $m^2$/g, preference being given, however, to high-dispersibility precipitated silicas, particularly if the invention serves for the production of tyres with very low rolling resistance. Examples of preferred high-dispersibility silicas include by way of example: Perkasil KS 430 (Akzo Nobel GmbH), BV 3380 and Ultrasil 7000 (Evonik Degussa), Zeosil 1165 MP and 1115 MP (Rhodia AG), Hi-Sil 2000 (PPG), Zeopol 8715, 8741 or 8745 (Zeopol Ltd.) and treated precipitated silicas, for example aluminium-"doped" silicas described in EP-A-0 735 088. It is possible to use one or more types of silica. Aluminium oxide is preferably likewise a high-dispersibility aluminium oxide, as described in EP-A-0 810 258, Examples include: Al25 or CR125 (Baikowski), APA-1OORDX (Condea), aluminium oxide C (Evonik Degussa) and AKP-GO 15 (Sumitomo Chemicals).

The pale-coloured reinforcing filler can take the form of powders, microbeads, granules or beads. In one preferred embodiment, silicas and/or aluminium oxides are used. Particular preference is given to silicas, in particular fine-particle silica, produced by way of example via precipitation from solutions of silicates or flame hydrolysis from silicon halides with BET specific surface areas of from 5 to 1000 $m^2$/g, preferably from 20 to 400 $m^2$/g, and/or with average primary particle sizes of from 10 to 400 nm. The silicas can also optionally take the form of mixed oxides with other metal oxides, examples being oxides of Al, of Mg, of Ca, of Ba, of Zn, of Zr, of Ti. Other materials likewise suitable are synthetic silicates, such as aluminium silicate, alkaline earth metal silicates, such as magnesium silicate or calcium silicate, with BET surface areas of from 20 to 400 $m^2$/g and with primary particle diameters of from 10 to 400 nm, natural silicates, such as kaolin and other naturally occurring silicas, glass fibres and glass-fibre products (mats, strands) or glass microbeads, metal oxides, such as zinc oxide, calcium oxide, magnesium oxide, aluminium oxide, metal carbonates, such as magnesium carbonate, calcium carbonate, zinc carbonate, and metal hydroxides, such as aluminium hydroxide, magnesium hydroxide, but these are preferably used only in a mixture with the silicas preferably used. The amounts preferably used of the pale-coloured fillers mentioned are from 1 to 200 parts by weight, in particular from 10 to 150 parts by weight, based on 100 parts by weight of entirety of rubber used (entirety composed of components A) and F)).

Alongside these materials, it is also possible to add rubber gels as fillers to the rubber mixtures of the invention. These rubber gels are in particular based on polybutadiene rubbers, on polychloroprene rubbers, on NBR rubbers or on SBR rubbers, as described by way of example in U.S. Pat. No. 6,797,780.

The total content of reinforcing pale-coloured filler and optionally of further fillers, such as carbon black, is preferably in the range from 10 to 300 parts by weight, more preferably from 30 to 250 parts by weight, and particularly preferably from 50 to 200 parts by weight, per 100 parts by weight of entirety of rubber used. The ideal amount depends on the nature of the pale-coloured filler used and on the desired application. A bicycle tyre requires a lower level of reinforcement than a pneumatic tyre for cars or utility vehicles, such as lorries.

The rubber mixtures of the invention comprise, as component C), trimethylolpropane (TMP-2-hydroxymethyl-2-ethylpropane-1,3-diol). This is generally produced industrially via aldol condensation and reduction of n-butyraldehyde using formaldehyde, in yields of about 90%, and subsequent distillative work-up. In this connection reference may be made by way of example to Ullmann, Verlag Chemie, Weinheim 1976 (4) 7, page 231. TMP serves, like component D), to improve the processability of the silica-containing rubber mixtures, in particular as agent that can reduce the viscosity of the rubber mixtures during processing. The rubber mixtures of the invention preferably comprise amounts of from about 0.5 to 10 parts by weight of trimethylolpropane, based on 100 parts by weight of entirety of rubber used. When IMP is added to the rubber mixtures of the invention it is particularly preferably in a mixture with the component D) described in more detail below.

The rubber mixtures of the invention preferably comprise at least one fatty acid as component D). The fatty acid serves, like the abovementioned component C), as agent for improving the processability of the silica-containing rubber mixtures, in particular as agent which can reduce the viscosity of the rubber mixtures during processing. Suitable fatty acids include naturally occurring and synthetic fatty acids and mixtures of these. Preference is given to saturated and unsaturated aliphatic straight-chain, branched or cyclic carboxylic acids having a carbon number of from 6 to 22, preferably from 8 to 20, and also mixtures of these.

Examples are naturally occurring saturated fatty acids such as caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachic acid (eicosanoic acid), behenic acid (docosanoic acid), lignoceric acid (tetracosanoic acid), and cerotinic acid (hexacosanoic acid), and also mixtures thereof. It is also possible to use 2-ethylhexanoic acid.

Other examples are mono- or polyunsaturated fatty acids, and also mixtures of these, e.g. myristoleic acid (9:10 tetradecenoic acid), palmitoleic acid (9:10 hexadecenoic acid), oleic acid (9:10 octadecenoic acid), vaccenic acid (11:12 octadecenoic acid), petroselinic acid (6:7 octadecenoic acid), gadoleic acid (9:10 eicosenoic acid), 11:12 eicosenic acid, erucic acid (12:14 docosenoic acid), linoleic acid (9:10 12:13 octadecadienoic acid), linolenic acid (octadecatrienoic acid), etc., and also mixtures thereof.

Other examples are saturated or unsaturated hydroxy-substituted fatty acids, e.g. ricinoleic acid, and also fatty acids having alicyclic side chains, in particular cyclopentenyl fatty acids.

Mixtures of fatty acids are also particularly suitable, examples being those based on natural raw materials arising by way of example during fatty acid cleavage, examples being coconut fatty acids, rapeseed fatty acids and soya fatty acids, and also fractions therefrom, and also other industrial mixtures composed mainly of fatty acids, e.g. tall oil fatty acids and in particular tallow fatty acids.

Particularly preferred fatty acids are distillation products from animal waste, for example from pigs, cattle or fish, in particular the materials known as tallow fatty acid mixtures, which can be unhardened or hardened mixtures, examples being fatty acid mixtures obtainable as Radiacid® 409 (Oleon).

In one very particularly preferred embodiment, stearic acid is used as fatty acid D).

The rubber mixtures of the invention preferably comprise amounts of from about 0.5 to 20 parts by weight, preferably from 1 to 10 parts by weight, of fatty acids, based on 100 parts by weight of entirety of rubber used.

The form in which components C) and D) are added to the rubber mixtures is particularly preferably that of a mixture comprising the same. In particular, the use of silicas in polymer matrices leads to a thickening effect. The use of the mixture mentioned leads in particular to an increase in flowability, i.e. to very low viscosity and pseudoplasticity of the rubber mixtures, and surprisingly an improvement in the dynamic mechanical properties of the vulcanizates is also achieved.

The mixtures mentioned, comprising components C) and D), are preferably composed of at least 80% by weight, more preferably at least 90% by weight, still more preferably at least 95% by weight, of components C) and D). They can also by way of example comprise further processing aids, such as polyols, or extenders, etc. The mixtures mentioned preferably comprise components C) and D) in a ratio by weight that is preferably from about 10:1 to 1:20. The rubber mixtures of the invention preferably comprise a proportion of the mixture mentioned such that the amount of components C) and D) in the rubber mixture is preferably from about 0.1 to 20 parts by weight, based on 100 parts by weight of entirety of rubber used.

In another embodiment of the invention, the rubber mixtures also comprise rubber additives, such as rubber auxiliaries, which by way of example improve the processing properties of the rubber mixtures, serve for the crosslinking of the rubber mixtures, or improve the physical properties of the vulcanizates produced from the rubber mixtures of the invention for the specific intended use of the same, or improve the interaction between rubber and filler, or serve to couple the rubber to the filler.

Examples of rubber auxiliaries are crosslinking agents, e.g. sulphur or sulphur-donor compounds, coupling agents, e.g. silanes, vulcanization accelerators, vulcanization activators, antioxidants, such as amines, phenols, mercaptobenzimidazoles, e.g. Vulkanox® 4010 or 4020, Vulkanox® HS/LG, Vulkanox® SKF or Vulkanox MB2 from Lanxess Deutschland GmbH, light stabilizers and antiozonants, e.g. microcrystalline waxes, e.g. Antilux® 654 from Rhein Chemie Rheinau GmbH, tackifiers, e.g. terpene resins, blowing agents, dyes, pigments, retarders, e.g. sulphonamides or phthalic acid derivatives, e.g. Vulkalent® B/C, EC or G from Lanxess Deutschland GmbH. Other processing aids can be used, examples being zinc soaps, fatty acids, fatty acid esters, fatty alcohols, fatty acid amides, extender oils, e.g. DAE (distillate aromatic extract), TDAE (treated distillate aromatic extract), MES (mild extraction solvates), RAE (residual aromatic extract), TRAE (treated residual aromatic extract), naphthenic and heavy naphthenic oils.

In one preferred embodiment, the rubber mixtures of the invention preferably comprise, as component E), at least one material known as a coupling agent. The coupling agent serves to modify the surface of the hydrophilic reinforcing filler so as to bond the said surface to the hydrophobic rubber matrix. The coupling agents are generally bifunctional compounds, in particular bifunctional organosilanes, which contain two types of functional groups: the alkoxysilyl group which bonds to the pale-coloured filler, and the sulphur-containing group which bonds to the elastomer.

According to the invention, it is possible to use one sulphur-containing alkoxysilane, or more than one of these in combination.

The person skilled in the art is aware of sulphur-containing alkoxysilanes as coupling agents (pale-coloured filler/diene elastomer) in rubber mixtures used for the production of pneumatic tyres; and in particular reference can be made to the following patents: U.S. Pat. No. 3,842,111, U.S. Pat. No. 3,873,489, U.S. Pat. No. 3,978,103 and U.S. Pat. No. 3,997,581, U.S. Pat. No. 5,580,919, U.S. Pat. No. 5,583,245, U.S. Pat. No. 5,663,396, U.S. Pat. No. 5,684,171, U.S. Pat. No. 5,684,172 and U.S. Pat. No. 5,696,197.

Preference is particularly given to symmetric polysulphide-containing alkoxysilanes of the following formula:

$$A\text{-}B\text{—}S_n\text{—}B\text{-}A$$

in which n is a whole number from 2 to 8; B is a divalent, optionally substituted hydrocarbon group, and A is a group of the formula $$\text{—}Si(R1)_{3-x}(R2)_x$$

in which x is from 1 to 3, and R1 is an optionally substituted alkyl group (preferably having from 1 to 20 carbon atoms), a cycloalkyl group (preferably having from 3 to 20 carbon atoms) or an aryl group (preferably having from 6 to 20 carbon atoms), R2 is an optionally substituted alkoxy group (preferably having from 1 to 20 carbon atoms) or a cycloalkoxy group (preferably having from 3 to 20 carbon atoms), see U.S. Pat. No. 5,684,172.

The polysulphide-containing alkoxysilane used according to the invention is preferably a polysulphide, in particular a disulphide or a tetrasulphide, of a bis($C_1$-$C_4$)alkoxy [and optionally ($C_1$-$C_4$)alkyl]silylpropyl moiety, still more preferably a bis($C_1$-$C_4$)trialkoxysilylpropyl and in particular bis(3-triethoxysilylpropyl) or bis(3-trimethoxysilylpropyl) moiety. Bis(triethoxysilylpropyl)disulphide or TESPD of the formula $[(C_2H_5O)_3Si(CH_2)_3S]_2$ is by way of example available from Degussa as Si266 or Si75 (the latter in the form of a mixture of disulphide (75% by weight) and polysulphide) or else from Witco as Silquest A1589, Bis(triethoxysilylpropyl)tetrasulphide or TESPT of the formula $[(C_2H_5O)_3Si(CH_2)_3S_2]_2$ is available by way of example from Degussa as Si69 (or X50S with 50% by weight of carbon black as carrier) or from Witco as Silquest A1289 (in each case a commercial mixture where the average value of n is about four 4). According to the invention, it is particularly preferable to use TESPT (Si69). The content of the polysulphide-containing alkoxysilane in the rubber mixtures produced according to the invention can preferably be in the range from 0.5 to 15% by weight, based on the total weight of the reinforcing pale-coloured filler.

It is equally possible to use silanes according to WO2007/068555 and EP-A-1285926.

It is particularly preferable to use, as thiol-containing silane, the compound of the formula (II)

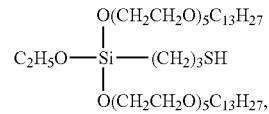

individually or optionally in a mixture with the abovementioned or other commercially available silanes.

The silane of the formula (II) is a commercially available product, available by way of example from Evonik Industries AG/Evonik Degussa GmbH.

Protected mercaptosilanes are also encompassed concomitantly, for example those described in Tire Technology International, 2007, pp. 74-77, in the form of a very wide variety of NXT silanes from Momentive.

According to the invention it is also possible, during activation of the filler, to make additional use of at least one coupling activator (see, for example, EP 1102812). However, according to the invention this is less preferred.

The silane can be coupled in advance to the diene elastomer by way of the sulphur-containing functional group, while the alkoxysilyl-containing group here is retained for coupling to the pale-coloured reinforcing filler. The silane can also be coupled in advance by way of the alkoxysilyl-containing group to the reinforcing pale-coloured filler, whereupon the filler thus precoupled can then be coupled by way of the sulphur-containing group to the diene elastomer. However, for reasons of better processability of the compositions in the unvulcanized state, the coupling agent is preferably either bonded to the reinforcing pale-coloured filler and then, having been bonded to the filler, mixed with the diene elastomer, or is mixed in the unreacted state with the filler and with the diene elastomer.

The filler can be activated in one stage (by combining filler, diene elastomer and silane all at once) or in two stages (first combining silane and filler or diene elastomer, preferably filler, and secondly addition of the component that is not yet present (filler or diene elastomer).

The total amounts advantageously used of the sulphur-containing alkoxysilanes are from 0.2 phr to 12 phr, based on 100 parts by weight of entirety of rubber.

According to the invention, it is possible per se to use any desired vulcanizing agent. Examples of vulcanizing agents are sulphur and sulphur donors, the amount of these that can be added, based on sulphur, being from 0.5 to 5.0 parts by weight, preferably from 1 to 2 parts by weight, for 100 parts by weight of entirety of rubber. If the amount is less than 0.5 part by weight, the breaking strength and the abrasion resistance of the vulcanized rubber decrease. If the amount exceeds 5 parts by weight, there is a tendency towards impairment of the elasticity of the rubber. Elemental sulphur is the preferred vulcanizing agent. Suitable vulcanizing agents are listed by way of example in Chapter 4. "Curing Agents" of Rubber Handbook, 9th Edition, 1996.

It is preferable that the rubber mixtures of the invention comprise at least one vulcanization accelerator and/or vulcanization activator. These can be selected from vulcanization accelerators and vulcanization activators known per se and mixtures thereof. Vulcanization accelerators preferred according to the invention are selected from the group listed below:

(i) Dithiophosphates
(ii) Sulphenamides
(iii) Thiazoles
(iv) Guanidines, such as diphenylguanidine
(v) Thiurams, e.g. tetramethylthiuram disulphide
(vi) Dithiocarbamates, e.g. zinc dimethyldithiocarbamate
(vii) Amines, e.g. cyclohexylethylamine
(viii) Thioureas, e.g. ethylenethiourea
(ix) Xanthogenates, e.g. zinc isopropyl xanthogenate
(x) Triazines, e.g. aminomercaptotriazine.

Dithiophosphate compounds (i) as vulcanization accelerators are known per se from carbon-black-filled systems from EP 0832920, EP 692518 and CA-A-2 153 509. These are commercially available compounds, e.g. Rhenocure TP/S and/or Rhenogran TP-50 and Rhenocure® SDT/S from Rhein Chemie Rheinau GmbH, or else the product from Monsanto that is available commercially as Vocol S (dibutyl dithiophosphate).

The ideal amount of the dithiophosphate compound is from 0 to 5 parts by weight, preferably from 0.25 to 3 parts by weight, based on 100 parts by weight of entirety of rubber.

According to the invention, it is moreover preferably possible to use one or more sulphenamide compounds (II) and/or a thiazole compound (iii), preferably at least one sulphenamide compound in combination with the dithiophosphate compound, as vulcanization accelerator. These sulphenamide compounds usually have the structural element —S—NR$_2$—, in which R is hydrogen or an organic moiety.

Preferred sulphenamides have the structure

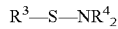

in which R$^3$ is preferably optionally substituted heteroaryl, more preferably benzo-condensed heteroaryl, particularly preferably benzothiazole, and R$^4$ is hydrogen and/or an optionally substituted straight-chain, branched or cyclic, preferably saturated hydrocarbon moiety having up to 12 carbon atoms, preferably a branched or cyclic alkyl moiety having up to 6 carbon atoms, more preferably cyclohexyl or tert-butyl.

The amount of sulphenamide compound preferably used in combination with the dithiophosphate compound is advantageously from 0.1 to 4 parts by weight, preferably from 0.2 to 3 parts by weight, more preferably from 0.5 to 2 parts by weight, based on the 100 parts by weight of the diene elastomer (component a)).

The compositions obtained according to the invention can moreover comprise one or more thiazole/benzothiazole compound as vulcanization accelerators, preferably in addition to the dithiophosphate. Benzothiazole compounds are compounds of this type which have at least one benzothiazole moiety, which can optionally have substitution. According to the invention, the expression "benzothiazole compounds" is intended to mean that no sulphenamide compounds as defined above are included, sulphenamide compounds therefore being excluded according to the invention from the scope of the benzothiazole compounds. Examples of these benzothiazole compounds having no sulphenamide group —S—NR$_2$ are: mercaptobenzothiazoles and dibenzothiazolyl disulphides, and preferred examples encompass alkylated mercaptobenzothiazoles and bis(alkylated benzothiazolyl)disulfides. Specific examples encompass mercaptobenzothiazole, 4-methylmercaptobenzothiazole, 4-ethylmercaptobenzothiazole, 2,2'-dithiobis-mercaptobenzothiazole, 2,2'-dithiobis(4-methylmercaptobenzothiazole), 2,2'-dithiobis(4-ethylmercaptobenzothiazole). A preferred representative compound is MBTS, 2,2'-dithiobis[benzothiazole], of the formula

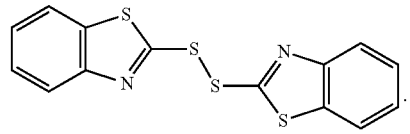 [SMILES: c1ccc2sc(SSc3nc4ccccc4s3)nc2c1]

The amount of the thiazole compound used in combination with the dithiophosphate compound is advantageously from 0 to 4 parts by weight, preferably from 0.1 to 3 parts by weight, more preferably from 0.5 to 2 parts by weight, based on the 100 parts by weight of the diene elastomer (component a)).

The compositions obtained according to the invention preferably comprise a sulphenamide compound as defined above.

Vulcanization activators are preferably selected from the following group: metal oxides, e.g. zinc oxide, and/or amines.

The total amount of rubber auxiliaries is in the range from 1 to 300 parts by weight, based on 100 parts by weight of entirety of rubber. It is preferable to use from 5 to 150 parts by weight of rubber auxiliaries.

A preferred vulcanizable rubber mixture of the invention comprises, based on 100 parts by weight of entirety of rubber: from 5 to 300 parts by weight, preferably from 5 to 120 parts by weight, of one or more pale-coloured fillers, from 0.1 to 20 parts by weight of components C) and D) and from 0 to 150 parts by weight of one or more further rubber additives E), of which it is preferable that from 0.1 to 10 parts by weight are of vulcanization agent.

The present invention further provides a process for the production of the rubber mixture of the invention, by adding a mixture comprising trimethylolpropane and comprising at least one fatty acid to a rubber mixture.

In particular, the process preferably encompasses the following steps:
(i) mixing of at least one functionalized diene rubber, of at least one pale-coloured filler and optionally of at least one coupling agent for the filler mentioned, then
(ii) addition of a mixture comprising trimethylolpropane and comprising at least one fatty acid, and then
(iii) addition of the other constituents of the rubber mixture.

It is particularly important that the trimethylolpropane and the fatty acid(s) are added directly to the mixture of the diene elastomer(s) and of the pale-coloured filler (and optionally of the coupling agent for the pale-coloured filler). In principle, trimethylolpropane and the fatty acid(s) can be added together or separately from one another here. It is important that they are added before the addition of the other constituents of the rubber mixture, for example of the constituents of the selected vulcanization system, e.g. vulcanizing agent, vulcanization accelerator and vulcanization activators.

The rubber mixtures of the invention can be produced in or on the conventional apparatuses, such as mixing assemblies, in particular roll mills, kneader, internal mixers and mixing extruders. The rubber mixtures of the invention can be vulcanized at temperatures which are preferably from 100 to 200° C., more preferably from 130 to 180° C., optionally at pressures of from 10 to 200 bar. The vulcanization process is carried out in a manner known per se during an adequate period which can, for example, be in the range from 5 to 90 minutes and which is in particular dependent on the vulcanization temperature, on the selected vulcanization system and on the kinetics of the vulcanization process for the respective composition.

The invention further provides the use of the rubber mixture of the invention for the production of pneumatic tyres or of semifinished products for pneumatic tyres, such as treads, underlayers for treads, vertex layers, side profiles, carcass layers, tyre beads, protectors, tubes or inner sides of tubeless tyres, etc.

The invention further provides a process for the production of crosslinked elastomer mouldings, which encompasses the introduction of the rubber mixtures produced according to the invention after into a mould and the subsequent vulcanization of the rubber mixture in the mould.

The invention therefore encompasses the rubber mixtures described above of the invention in the unvulcanized state (i.e. prior to vulcanization) and also in vulcanized form (i.e. after crosslinking or vulcanization). The compositions produced according to the invention can, of course, be used individually or in a blend with any desired other rubber mixtures that can be used for the production of pneumatic tyres.

A particular feature of the rubber mixtures of the invention is lowered viscosity of the mixture, good flowability and a low level of processing risk, and also improved vulcanization kinetics, and they give vulcanizates with better dynamic mechanical properties. They are also therefore particularly suitable for the low-cost production of highly reinforced, abrasion-resistant mouldings, such as cable sheathing, hoses, drive belts, conveyor belts, roll coverings, (pneumatic) tyres, shoe soles, gasket rings and damping elements. Very particular preference is given to the use of the rubber mixtures of the invention for the production of low-rolling-resistance tyre treads.

The invention also provides the use of the rubber mixtures of the invention for the production of rubber vulcanizates, especially for the production of tyres, in particular tyre treads.

The examples below serve to illustrate the invention, but without limiting effect.

EXAMPLES

The rubber mixtures listed in Table 1 were produced. The mixture of Comparative Example 1 comprises non-functionalized diene rubbers without processing aid, Comparative Example 2 comprises non-functionalized diene rubber with the processing aid corresponding to components C) and D). Comparative Example 3 comprises a functionalized diene rubber without processing aid. Example 4 of the invention comprises a functionalized diene rubber with a processing aid corresponding to components C) and D).

The mixtures listed in Table 1 (without sulphur, benzothiazolesulphenamide, guanidine and sulphonamide) were mixed for a total of 6 minutes in a 1.5 L kneader in a first mixing stage, where the temperature rose from 70 to 150° C. within a period of 3 minutes and the mixture was kept at 150° C. for 3 minutes. The total amount of the silane was also added in the 1st mixing stage. The mixtures were then discharged and cooled to room temperature for 24 hours, and, in a 2nd mixing stage, again heated to 150° C. for 3 minutes. The product was then cooled, and the following constituents of the mixture were then admixed at from 40 to 60° C. on a roll mill: sulphur, benzothiazolesulphenamide, guanidine and sulphonamide.

TABLE 1

Constitution of unvulcanized rubber mixtures

| | Example 1 comparison | Example 2 comparison | Example 3 comparison | Example 4 of the invention |
|---|---|---|---|---|
| SSBR (BUNA VSL 5025-2, Lanxess Deutschland GmbH)[a] | 96.3 | 96.3 | 0 | 0 |
| Functionalized SSBR[b] | 0 | 0 | 98.7 | 98.7 |
| High-cis polybutadiene (BUNA CB 24, Lanxess Deutschland GmbH)[c] | 30 | 30 | 30 | 30 |
| TMP/fatty acid mixture[d] | 0 | 3 | 0 | 3 |
| Silica acid (ULTRASIL 7000 GR, Evonik) | 90 | 90 | 90 | 90 |
| Carbon black (VULCAN J/N375, Cabot) | 7 | 7 | 7 | 7 |
| TDAE oil (VIVATEC 500, Hansen und Rosenthal) | 10 | 10 | 7.6 | 7.6 |
| Stearic acid (EDENOR C 18 98-100, Cognis Deutschland GmbH) | 1 | 1 | 1 | 1 |
| Antioxidant (VULKANOX 4020/LG, Lanxess Deutschland GmbH) | 2 | 2 | 2 | 2 |
| Antioxidant (VULKANOX HS/LG, Lanxess Deutschland GmbH) | 2 | 2 | 2 | 2 |
| Zinc oxide (ZINKWEISS ROTSIEGEL, Grillo Zinkoxid GmbH) | 3 | 3 | 3 | 3 |
| Light-stabilizer wax (ANTILUX 654, Rhein Chemie Rheinau GmbH) | 2 | 2 | 2 | 2 |
| Silane (SI 69, Evonik) | 7.2 | 7.2 | 7.2 | 7.2 |
| Sulphonamide (VULKALENT ® E/C, Lanxess Deutschland GmbH) | 0.2 | 0.2 | 0.2 | 0.2 |
| Diphenylguanidine (VULKACIT ® D/C, Lanxess Deutschland GmbH) | 2.2 | 2.2 | 2.2 | 2.2 |
| Benzothiazolesulphenamide (VULKACIT ® NZ/EGC, Lanxess Deutschland GmbH) | 1.6 | 1.6 | 1.6 | 1.6 |

TABLE 1-continued

Constitution of unvulcanized rubber mixtures

|  | Example 1 comparison | Example 2 comparison | Example 3 comparison | Example 4 of the invention |
|---|---|---|---|---|
| Sulphur (MAHLSCHWEFEL 90/95 CHANCEL, Solvay Barium Strontium) | 1.6 | 1.6 | 1.6 | 1.6 |

[a] VSL 5025-2: Solution SBR having 50% vinyl content, 25% styrene content, 27.3% TDAE oil content, Mooney viscosity (ML1 + 4 at 100° C.) 50 Mooney units
[b] Functionalized solution SBR: Trial product from Lanxess Deutschland GmbH having 46% vinyl content, 24% styrene content, 29.1% TDAE oil content, Mooney viscosity (ML1 + 4 at 100° C.) 52 Mooney units, level of COOH functionalization: 35 meq/kg
[c] Buna CB 24: Nd polybutadiene having >97% cis-content, Mooney viscosity (ML1 + 4 at 100° C.) 44 Mooney units
[d] TMP/Fatty acid mixture: 25% of trimethylolpropane, 70% of stearic acid, 5% of polyethylene glycol The values collated in Table 2 were determined on the unvulcanized rubber mixtures.

TABLE 2

Properties of the unvulcanized rubber mixtures produced according to Table 1

|  | Example 1 comparison | Example 2 comparison | Example 3 comparison | Example 4 of the invention |
|---|---|---|---|---|
| Mooney viscosity ML 1 + 1 (100° C.) [MU] | 88.8 | 67.7 | 78.4 | 71.7 |
| Mooney viscosity ML 1 + 4 (100° C.) [MU] | 76.5 | 60.5 | 71.2 | 64.6 |
| Mooney relaxation/10 sec. [%] | 24.6 | 18.5 | 24.0 | 21.0 |
| Mooney relaxation/30 sec. [%] | 18.5 | 12.4 | 17.8 | 14.8 |

The use of the TMP/fatty acid mixture leads to lowering of the Mooney viscosity of the mixture, both in the rubber mixture with non-functionalized diene rubbers (cf. Example 2 with Example 1) and in the rubber mixture with functionalized diene rubber (cf. Example 4 with Example 3).

The mixtures listed in Table 1 were vulcanized in a press at 160° C. for 20 minutes. The values collated in Table 3 were determined on the vulcanisates.

TABLE 3

Vulcanizate properties of the rubber mixtures according to Table 1

|  | Example 1 comparison | Example 2 comparison | Example 3 comparison | Example 4 of the invention |
|---|---|---|---|---|
| Shore A hardness at 23° C. (DIN 53505) | 65.7 | 65.0 | 63.3 | 62.8 |
| Shore A hardness at 70° C. (DIN 53505) | 62.5 | 62.0 | 59.2 | 59.0 |
| Rebound resilience at 23° C. [%] (DIN 53512) | 30.5 | 31.0 | 31.5 | 33.5 |
| Rebound resilience at 60° C. [%] (DIN 53512) | 55.5 | 55.5 | 57.0 | 60.0 |
| tan δ at 0° C. (dynamic damping at 10 Hz) | 0.317 | 0.299 | 0.412 | 0.465 |
| tan δ at 60° C. (dynamic damping at 10 Hz) | 0.119 | 0.119 | 0.102 | 0.088 |
| ΔG* (G* (0.5% elongation)-G* (15% elongation)) [MPa] (MTS at 1 Hz, 60° C.) | 1.52 | 1.98 | 0.82 | 0.67 |
| tan δ maximum (MTS at 1 Hz, 60° C.) | 0.177 | 0.180 | 0.151 | 0.141 |

Tyre applications require low rolling resistance, and this is obtained when the values measured in the MTS system on the vulcanizate are high for rebound resilience at 60° C., low tan δ for dynamic damping at high temperature (60° C.) and very low ΔG* and low tan δ maximum, Tyre applications also require high wet skid resistance, and this is obtained when the vulcanizate exhibits a high tan δ value for dynamic damping at low temperature (0° C.).

As can be seen from Table 3, the use of the TMP/fatty acid mixture in the rubber mixture with the non-functionalized diene rubbers leads, in the corresponding vulcanizate, to values that remain the same for rebound resilience at 60° C. and tan δ at 60° C., and to higher ΔG* and higher tan δ maximum in the MTS system, and also to a lower tan δ value at 0° C. when comparison is made with the vulcanizate values from the rubber mixture without processing aid (cf. Example 2 with Example 1). It can therefore be concluded that impairment not only of rolling resistance but also of wet skid resistance is associated with the use of the TMP/fatty acid mixture.

Surprisingly, the use of the TMP/fatty acid mixture in the rubber mixture with the functionalized diene rubber leads, in the corresponding vulcanizate, to higher rebound resilience at 60° C., to a lower tan δ value at 60° C., to a lower ΔG* and to a lower tan δ maximum in the MTS system, and also to a higher tan δ value at 0° C. when comparison is made with the vulcanizate values from the rubber mixture with the functionalized diene rubber, but without processing aid (cf. Example 4 with Example 3). The use of the TMP/fatty acid mixture in the rubber mixture with the functionalized diene rubber accordingly leads to an improvement not only in rolling resistance but also in wet skid resistance.

The invention claimed is:

1. A vulcanizable rubber mixture comprising:
  A) at least one diene rubber functionalized with carboxy groups and/or hydroxy groups and/or with their salts, wherein the functionalized diene rubber is composed of 40 to 100% by weight of units derived from 1,3-butadiene, and 0 to 60% by weight of units derived from styrene, and a proportion of bonded functional groups and/or of their salts is 0.02 to 5% by weight, based on 100% by weight of the diene rubber,
  B) at least one pale-coloured filler,
  C) trimethylolpropane, and
  D) at least one fatty acid,
  wherein the sum total of components C) and D) is 0.1 to 20 parts by weight, based on 100 parts by weight of component A).

2. The rubber mixture according to claim 1, wherein the pale-coloured filler B) comprises at least one silica.

3. The rubber mixture according to claim 1, further comprising at least one vulcanizing agent and/or at least one vulcanization accelerator.

4. The rubber mixture according to claim 1 comprising, based on 100 parts by weight of component A):
  5 to 300 parts by weight of the one or more pale-coloured fillers B), and
  0 to 150 parts by weight of one or more further rubber additives E).

5. The rubber mixture according claim 4, wherein the ratio by weight of component C) to component 0) is from 10:1 to 1:20.

6. The rubber mixture according to claim 1, wherein the ratio by weight of component C) to component D) is from 10:1 to 1:20.

* * * * *